Oct. 22, 1940.   J. ASMUSSEN   2,219,063
VALVE RESEATER
Filed July 14, 1938
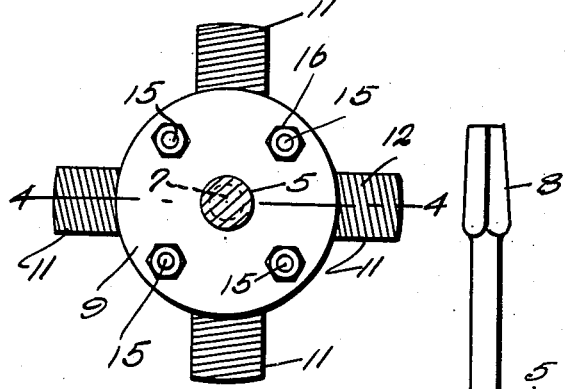
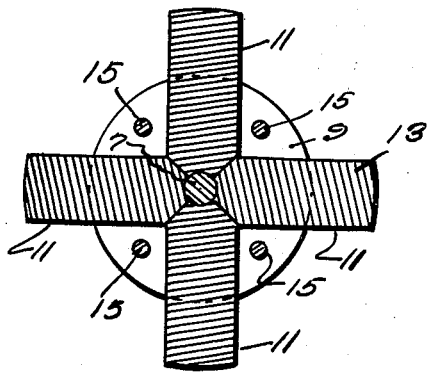
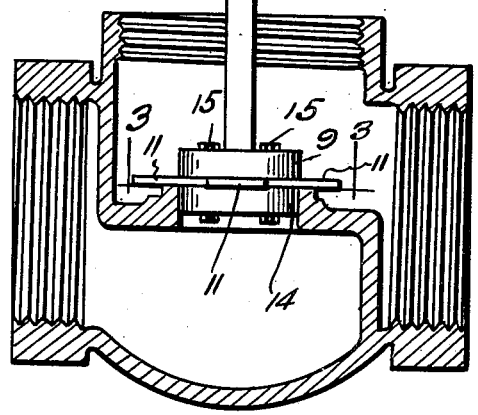
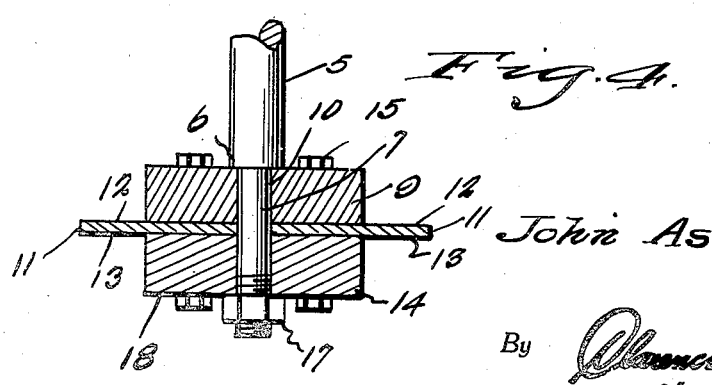
Inventor
John Asmussen
By Clarence A. O'Brien
and Hyman Berman
Attorneys Patented Oct. 22, 1940

2,219,063

UNITED STATES PATENT OFFICE 2,219,063

VALVE RESEATER

John Asmussen, Laurel, Md.

Application July 14, 1938, Serial No. 219,259

1 Claim. (Cl. 90—12.5)

The present invention relates to new and useful improvements in valve reseating tools particularly for globe valves and has for its primary object to provide, in a manner as hereinafter set forth, a device of this character embodying a novel construction, combination and arrangement of parts through the medium of which a worn valve seat may be re-ground to present a new surface for contacting the valve head.

Other objects of the invention are to provide a valve re-seating tool of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a side elevational view of my invention, shown in position for operation in a conventional globe type valve.

Figure 2 is a top plan view of the invention.

Figure 3 is a transverse sectional view taken substantially on the line 3—3 of Fig. 1.

Figure 4 is a vertical transverse sectional view taken substantially on the line 4—4 of Figure 2.

Referring now to the drawing in detail it will be seen that the reference numeral 5 designates a shank the lower end portion of which is reduced in diameter to provide a shoulder 6, and screw threaded extension 7. The upper end portion of the shank 5 is squared and tapered as at 8 to adapt it to fit the chuck of a suitable actuator.

An upper annular plate 9 provided with a central circular opening 10 is adapted to be mounted on the extension 7 with that part of its top surface adjacent the opening 10 abutted against the shoulder 6.

Plates 11 provided with upper and lower cutting faces 12 and 13 are clamped against the lower face of the upper annular ring 9 by means of a lower annular plate 14 which is of the same construction as the upper annular plate 9. Bolts or other suitable securing means 15 pass through aligned openings 16 in the upper and lower annular plates 9 and 14 to securely hold the cutter plates 11 in operative position.

A nut 17 is threaded onto the threaded extension 7 to contact the lower face 18 of the annular plate member 14 to securely hold the assembled plates 11, upper annular plate 9 and lower ring 14 in fixed position on the extension 7 of the shank 5.

The operation of the device is thought to be manifest but may be briefly described as follows:

The squared and tapered portion 8 of the shank 5 is inserted in a chuck of a suitable actuator while the lower end portion of the device constituting the cutters 11 and annular plates 9 and 14 is placed within the body of a valve, as shown in Fig. 1 of the drawing, with the lower annular plate 14 within the valve seat opening and the lower faces 13 of the cutter plates 11 in contact with the valve seat. The device is then rotated by the chuck and actuator to cause the cutter plates 11 to rotate and cut off a portion of the valve seat thereby renewing the surface of the same.

Although I have shown and described herein a preferred embodiment of my invention, it is to be definitely understood that I do not desire to limit the application of the invention thereto, and any change or changes may be made in the materials and in the structure and arrangement of the parts within the spirit of the invention as claimed.

What is claimed is:

In a device of the character described, a valve reseating tool comprising a shank of substantially uniform diameter throughout, a screw threaded extension of reduced diameter on said shank to provide a shoulder at the lower end portion of said shank, a top annular plate having substantially smooth parallel top and bottom surfaces and further having vertical spaced openings therein, a bottom annular plate having substantially smooth parallel top and bottom surfaces and further having vertical spaced openings therein aligned with said top annular plate openings, securing means passing through said aligned openings to secure said annular plates together with cutter plates mounted therebetween, and a nut engageable on said threaded extension to releasably hold said annular plates and cutter plates on said threaded extension in contact with said shoulder.

JOHN ASMUSSEN.